United States Patent [19]

Beauvais et al.

[11] 4,146,176

[45] Mar. 27, 1979

[54] EXHAUST GAS HEAT SYSTEM UTILIZING A HEAT PIPE

[75] Inventors: Francis N. Beauvais, Dearborn; William J. Clemens, Dearborn Heights, both of Mich.

[73] Assignee: Ford Motor Company, Dearborn, Mich.

[21] Appl. No.: 851,240

[22] Filed: Nov. 14, 1977

[51] Int. Cl.² .............................................. B60H 1/08
[52] U.S. Cl. .................................. 237/12.3 A; 165/32
[58] Field of Search ...................... 237/12.3 R, 12.3 A, 237/123; 165/32, 104 R

[56] References Cited

U.S. PATENT DOCUMENTS

| 3,604,503 | 9/1971 | Feldman | 165/32 X |
| 3,618,854 | 11/1971 | Frank | 237/12.3 B |
| 3,986,665 | 10/1976 | Kofink | 237/12.3 A |

FOREIGN PATENT DOCUMENTS

| 2523646 | 12/1976 | Fed. Rep. of Germany | 237/12.3 A |
| 2551911 | 6/1977 | Fed. Rep. of Germany | 237/12.3 A |

Primary Examiner—J. Franklin Foss
Attorney, Agent, or Firm—John J. Roethel; Keith L. Zerschling

[57] ABSTRACT

A heating system for a vehicle passenger compartment, the vehicle being propelled by an internal combustion engine having an exhaust system that includes a catalytic converter for exhaust gas emission control. The vehicle passenger compartment has a conventional heater case containing air distribution channeling ducts, air outlets, control valves and a blower for forcing air through the ducts. A heat pipe coupled to a heat exchanger located in the engine exhaust system downstream of the catalytic converter is utilized to transfer exhaust gas heat to the heater case thereby eliminating the conventional heater core, and its related plumbing, that utilizes engine coolant as a heat source.

3 Claims, 3 Drawing Figures

U.S. Patent  Mar. 27, 1979  4,146,176
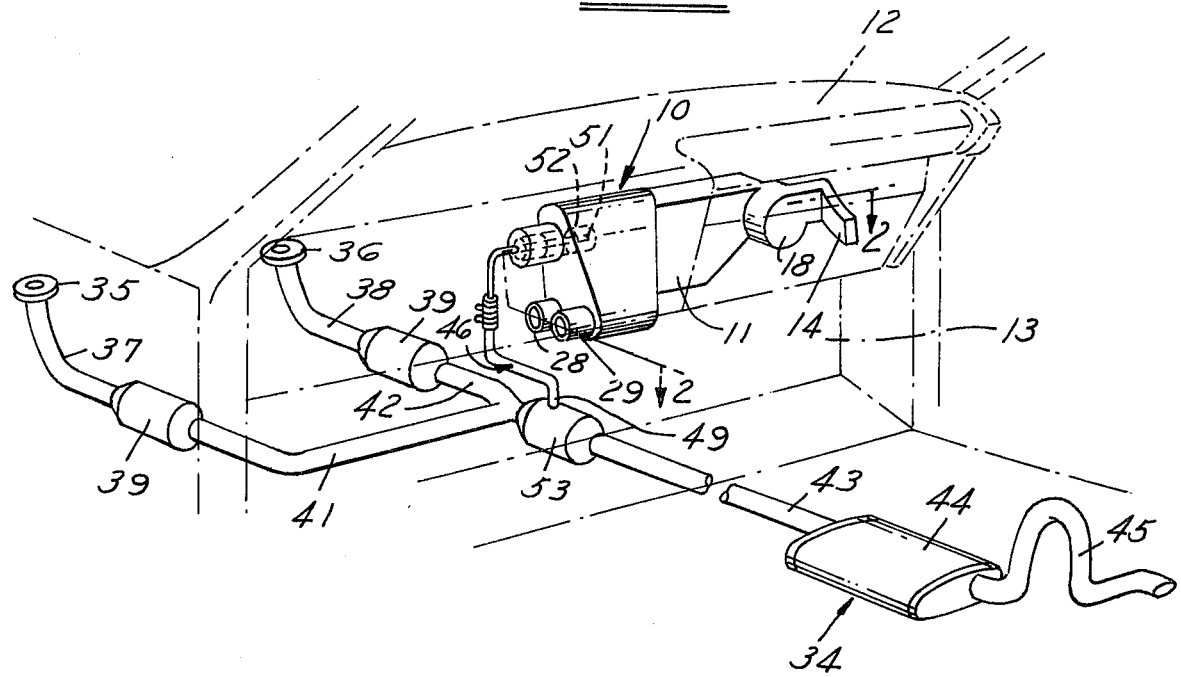
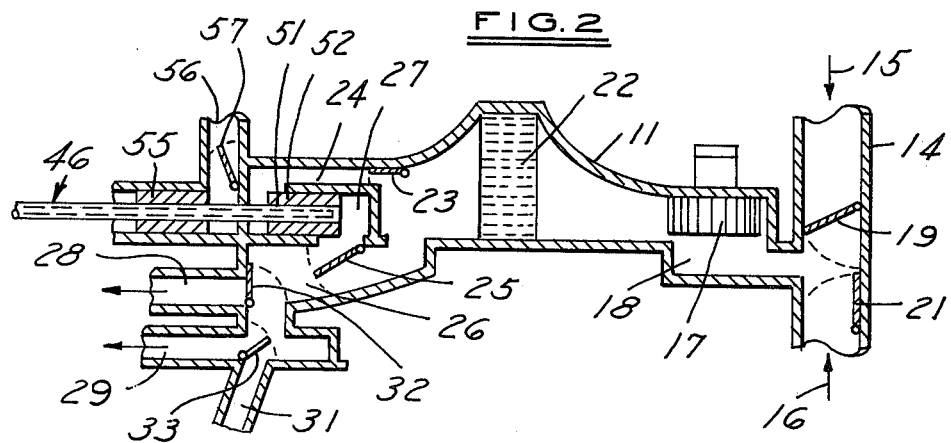
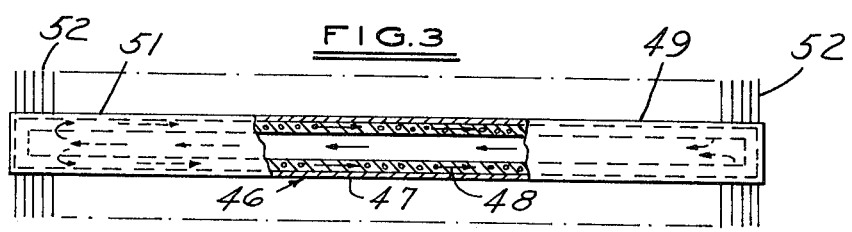

EXHAUST GAS HEAT SYSTEM UTILIZING A HEAT PIPE

BACKGROUND OF THE INVENTION

The conventional method of heating the passenger compartment of motor vehicles propelled by liquid cooled internal combustion engines relies on the passage of air through a heater core to which heat is supplied via the engine coolant. From a cold start, heater discharge air reaches 100° F. (approximately 38° C.) after six-eight minutes operation.

In the November 1968 issue of Mechanical Engineering, pages 48 to 53, inclusive, K. Thomas Feldman, Jr. and Glen H. Whiting, in an article entitled "Applications of the Heat Pipe", described a heat pipe as follows:

"The basic elements of the heat pipe are a closed outer shell, a porous capillary wick, and a working fluid."

The operation of a heat pipe is described as follows:

"Heating one region of the heat pipe evaporates working fluid and drives the vapor to other regions where it condenses, giving up its latent heat. In the wick, surface tension forces return the condensate back to the evaporator region through capillary channels."

The authors suggest that "a flexible heat pipe could connect the hot exhaust manifold of an automobile engine to heat rejection fins inside the car, thus providing a rapid startup near isothermal auto heating system which requires no water circulation pumps." Although this suggestion was made in 1968, to our knowledge the use of a heat pipe in an automobile heating system has not found acceptance. This may have been because of the difficulty of providing a suitable coupling of the heat pipe to the engine exhaust manifold or to the difficulty of packaging a heat pipe structure and related tubing in the engine compartment due to a lack of space.

The current use of catalytic converters in vehicle exhaust systems for exhaust gas emissions control has resulted in exhaust gas temperatures that are high enough during engine warmup to supply heat to a vehicle passenger compartment in one-third the time of a conventional system utilizing engine coolant as the source of heat.

It is, therefore, an object of the present invention to utilize a heat pipe to transfer exhaust heat passing through a heat exchanger located in a vehicle engine exhaust system that includes one or more catalytic converters.

SUMMARY OF THE INVENTION

The present invention relates to a heating system for the passenger compartment of a vehicle propelled by an internal combustion engine that has an exhaust system which includes a catalytic converter for reducing undesirable exhaust gas emissions. The catalytic converter is interposed between the engine exhaust manifold and the exhaust muffler. The passenger compartment has a conventional heater case containing air distribution channeling ducts, air outlets, control valves for controlling air flow through the ducts and air outlets, and a blower for forcing air through the ducts.

The improvement of the present invention comprises replacement of a heat exchanger in the exhaust system downstream of the catalytic converter. A heat pipe means having an evaporator section at one end, a condenser section at the opposite end and transfer means connecting the two end sections is coupled through the evaporator section to the heat exchanger in position to absorb heat from exhaust gas flowing through the latter. The condenser section is coupled to the heater casing and is constructed and arranged within the latter in position to transfer heat received via the heat transfer means from the heat pipe means evaporator section to air being forced through the ducts for distribution through selected air outlets.

The heat pipe means preferably includes a flexible bellows section between the evaporator and condenser section to allow for assembly mis-alignment and movement of the exhaust system relative to the heater case.

DESCRIPTION OF THE DRAWINGS

Further features and advantages of the present invention will be more apparent as this description proceeds, reference being had to the accompanying drawings, wherein:

FIG. 1 is a perspective schematic view of a heating system in accordance with the present invention;

FIG. 2 is a cross-section on the line 2—2 of FIG. 1; and

FIG. 3 is a view in part sectional of the basic elements of a heat pipe.

DETAILED DESCRIPTION OF THE INVENTION

Referring now to the drawings, there is schematically illustrated in FIG. 1 a heating system, generally designated 10, for a passenger compartment of a motor vehicle. The heating system 10 comprises a heater case 11 mounted under the instrument panel 12 of the vehicle rearwardly of the fire wall 13 separating the engine compartment from the passenger compartment, the instrument panel 12 and fire wall 13 being shown in dot and dash outline. The heater case 11 has a plurality of air distribution channeling ducts, air outlets, control valves for controlling air flow through the ducts and air outlets, and a blower for forcing air through the ducts.

The heater case 11, as exemplified in FIG. 2, has at its right end as viewed in the drawing, a duct 14 through which outside air indicated by the arrow 15 or inside or recirculating air indicated by the arrow 16 may be drawn into the blower 17 plenum chamber 18 depending on the position of the damper or control valves 19 and 21. As shown, valve 19 is fully closed thereby preventing outside air from being taken into the system and valve 21 is open so that only inside air is recirculated from the passenger compartment through the heating system.

In the center of the heater case 11 is shown an evaporator 22 as would be used in a system providing both heating and air cooling capabilities. In a conventional system, the heater case 11 would be provided at its left end as viewed in FIG. 2 with a heater core. The heater core would be connected by suitable plumbing to the engine coolant system. The heat of the engine coolant would be extracted from the latter as it flows through the core tubes and as the air to be heated is passed over the fins surrounding the tubes. As shown in FIG. 2, a damper 23 is positioned to either permit or restrict air flow into a duct 24 and a damper 25 is positioned to either permit or restrict flow into a plenum chamber 26. The duct 24 leads to a chamber 27 in which the heater core normally would be mounted. With the dampers 23 and 25 positioned as shown in FIG. 2, the air flowing into the plenum chamber 26 would be a blend of heated and cooled air to obtain the desired temperature of the air to be distributed into the passenger compartment.

The plenum chamber 26 is schematically shown as being capable of feeding air into a plurality of ducts 28, 29 and 31. The volume of air flowing through the duct 28 is controlled by a damper 32 and the volume of air that is directed into the ducts 29 and 31 is controlled by a damper 33. The duct 28, for example, would be in communication with the air outlets through which it is conventional to supply cooling air to the passenger compartment and, as shown, this duct would be closed by the damper 32 if it is intended that air will be supplied to the ducts 29 and 31. Duct 29 could lead to the defroster outlets in the top of the instrument panel and the duct 31 could lead to outlets which would direct heated air to the vehicle floor. The damper 33 is so positioned that it can split the air flow from the plenum chamber 26 into the ducts 29 and 31, or close off either one but not both at the same time.

As will be more fully explained, the heater case 11 does not have fitted therein a conventional heater core, that is, one that is connected to the engine cooling system to obtain hot water to act as a heat source.

Referring now to FIG. 1, there is shown an internal combustion engine exhaust system, generally designated 34, such as would be connected to a V-8 engine (not shown) having two banks of cylinders and therefore two exhaust manifolds. In FIG. 1, there is shown the flanges 35 and 36 which would be coupled to the exhaust manifolds of the engine, as would be well known. In accordance with modern day practice, in order to reduce the unwanted exhaust gas emissions, each line 37 and 38 leading from the exhaust manifolds has a catalytic converter 39 the discharge sides of which are coupled by suitable conduits 41 and 42 to a single conduit 43 leading to a conventional muffler 44 and then exhausting eventually through a conduit 45 to the atmosphere.

It has been found that the current use of catalytic converters has resulted in exhaust gas temperatures that are high enough during engine warmup to supply heat to the passenger compartment in one-third the time of a standard heating system in which the heat is supplied via engine coolant. It has been suggested in the prior art that exhaust gas heat be used as the heat source for vehicle heating systems. One major disadvantage of causing exhaust gas to flow through a heater core is that the fumes are dangerous. Any leakage in the system could present a hazard to the vehicle occupants.

The present invention takes advantage of the high temperature exhaust gas to be found on the downstream or exhaust side of a catalytic converter without introducing exhaust gas into the passenger compartment. This is accomplished by use of a heat pipe 46. Referring to FIG. 3, and as explained in the article "Application of the Heat Pipe" referred to in the Backgound of the Invention statement, the basic elements of the heat pipe 46 are a closed outer shell 47, a porous capillary wick 48 and a working fluid. The wick 48 is held uniformly against the inside wall of the pipe. Although the heat pipe is shown as a cylinder in FIG. 3, the heat pipe may assume many geometric shapes.

Heating one region of the heat pipe evaporates working fluid and drives the vapor to other regions where the vapor is condensed, giving up its latent heat. In the wick 48, surface tension forces return the condensate back to the evaporator region 49 through capillary channels. The end of the heat pipe in which the vapor condenses is known as the condenser, herein designated 51. Where the heat pipe is required to operate against gravity or in an acceleration field (that is, with the evaporator end above the condenser or in a "g" field), surface tension forces in the wick can lift the liquid about one to four feet depending on the type of wick and liquid used. Suitable fins 52 may be placed on each end of the heat pipe to facilitate the heat transfer.

Referring now to FIG. 1, the exhaust end 49 of the heat pipe is coupled to a heat exchanger 53 located downstream or on the exhaust side of the catalytic converters 39. The heat exchanger 53 may be integrated with one of the catalytic converters 39 to reduce the space requirements. The exhaust end of the heat pipe, the evaporator 49, is provided with suitable fins 52 that absorb heat from exhaust gas passing through the heat exchanger. Heat is then transported through the heat pipe 46 to its condenser end 51, which is packaged in the chamber 27 of the heater case 11. The condenser end 51 is also provided with fins 52 and heat is transmitted to the passenger compartment by passing air over these fins. The heating of the air thus occurs in the same manner as it would occur when air passes through a standard heater core in a conventional heater.

Secondary features of the heat pipe system include (a) a flexible bellow section 54 in the heat pipe 46 to allow for production mis-alignment and movement of the exhaust system relative to the heater case 11; and (b) a by-pass cooler section 55 on the condenser end 51 of the heat pipe 46 to prevent overheating when the vehicle heater system is not in use. Cooling air for the by-pass cooler section 55 may be supplied through a duct 56 having a control damper 57. The duct 56 may be supplied by air from the standard blower 17 or by a secondary blower (not shown). With the use of the heat pipe 46, no exhaust gas is introduced into the passenger compartment since the evaporator end of the heat pipe is connected to the exhaust system externally of the passenger compartment.

A secondary result of using the heat pipe in the exhaust system of the vehicle, is that the higher exhaust gas temperature resulting from the use of the catalytic converters in the system is reduced prior to flowing through the muffler thereby increasing the life expectancy of the muffler and the tail pipe.

It is to be understood this invention is not limited to the exact construction illustrated and described above, but that various changes and modifications may be made without departing from the spirit and scope of the invention as defined by the following claims.

We claim:

1. A heating system for the passenger compartment of a vehicle propelled by an internal combustion engine,
the engine having an exhaust system that includes a catalytic converter for reducing undesirable exhaust gas emissions interposed between an engine exhaust manifold and an exhaust muffler,
the passenger compartment having a heater case containing air distribution channelling ducts, air outlets, control valves and a blower for forcing air through the ducts,
wherein the improvement comprises:
a heat exchanger located in the exhaust system downstream of the catalytic converter,
a heat pipe means having an evaporator section at one end, a condenser section at the opposite end, and heat transfer means connecting the two end sections, the evaporator section being coupled to the heat exchanger to absorb heat from exhaust gas flowing through the latter, the condenser section being coupled to the heater casing and being constructed and arranged within the latter in position to transfer heat received via the heat transfer means from the heat pipe means evaporator section to air being forced through the ducts for distribution through selected air outlets, the heat pipe means having on its condenser end a by-pass cooler section fitted into a section of duct isolated from the ductwork containing the air heating condenser section, whereby cooling air supplied to the duct section containing the by-pass cooler prevents overheating of the heat pipe means when no air is passed over the condenser section.

2. A heating system according to claim 1, in which:

the heat exchanger to which the evaporator section of the heat pipe means is coupled is located in the engine exhaust system between the catalytic converter and the exhaust muffler.

3. A heating system according to claims 1 or 2, in which:

the heat pipe means includes a flexible bellows section between the end sections to allow for assembly misalignment and movement of the exhaust system relative to the heater case.

* * * * *